United States Patent [19]

Grallien et al.

[11] 4,025,955
[45] May 24, 1977

[54] LOW LIGHT LEVEL IMAGE PICK-UP TUBE ARRANGEMENT

[75] Inventors: Jean-Claude Grallien; Ange Corbel, both of Paris, France

[73] Assignee: Thomson-CSF, Paris, France

[22] Filed: Sept. 29, 1975

[21] Appl. No.: 617,732

[30] Foreign Application Priority Data

Oct. 1, 1974 France .............................. 74.33032

[52] U.S. Cl. ................................. 358/219; 358/211; 250/213 VT
[51] Int. Cl.$^2$ .......................................... H04N 5/19
[58] Field of Search ..................... 178/7.2, DIG. 29; 250/213 VT

[56] References Cited

UNITED STATES PATENTS

| | | | |
|---|---|---|---|
| 3,206,547 | 9/1965 | Leitich et al. | 178/DIG. 29 |
| 3,748,383 | 7/1973 | Grossman | 178/7.2 |
| 3,816,744 | 6/1974 | Chow | 250/213 VT |
| 3,848,085 | 11/1974 | Van Atta | 178/DIG. 29 |
| 3,848,123 | 11/1974 | Parker et al. | 250/213 VT |
| 3,903,451 | 9/1975 | Hall et al. | 250/213 VT |

*Primary Examiner*—Robert L. Richardson
*Attorney, Agent, or Firm*—Edwin E. Greigg

[57] ABSTRACT

A low light level image pick-up tube is protected from excessive illumination intensity damage by controlling very high voltage generating means supplying the tube. The tube comprises in a preferred embodiment two image intensifier stages in cascade preceding an electron gun from which a video signal is provided by electronic scanning.

A mean level video measuring circuit provides from the video signal a control signal used to produce on the one hand, a video regulation by varying the amplitude of a supply DC voltage provided to the second image intensifier stage, i.e. that preceding the electron gun, and on the other hand, a diaphragm effect by varying the amplitude and duration of a supply voltage provided by a VHV switched supply circuit to the input image intensifier stage. Further, the switched supply is controlled to cancel out instantaneously the gain of the input intensifier stage so as to protect the camera against sudden and too intensive illumination.

11 Claims, 14 Drawing Figures

LOW LIGHT LEVEL IMAGE PICK-UP TUBE ARRANGEMENT

BACKGROUND OF THE INVENTION

The present invention relates to a low light level image pick-up tube arrangement. The invention applies more particularly to equipment comprising a pick-up tube or a television camera tube which is intended to operate with very limited ambient illumination in the visible range and possibly in the near infra-red range, the scene illumination possibly being equivalent to that produced by the residual night light.

Such arrangements are fitted in particular to industrial or military surveillance systems. As an example the arrangement may form part of a fire-control system so as to make possible night-time aiming and firing. In this type of application, which should not be looked upon as limiting, bright lights caused by firing appear in the field of view of the so-called "camera" device.

Owing on the one hand to the high ratio between the illumination produced by such extraneous sources and the ambient nighttime light level, and on the other hand to the extreme sensitivity of the camera tube incorporated in the device, difficulties arise the seriousness of which depends on the brightness of the sources in question, the length of time for which they persist and the area which they occupy in the observed field.

Unless special steps are taken, there is a danger of the target of a low-light-level camera tube being suddenly saturated over the whole or part thereof when the scene illumination exceeds permitted limits; the tube will then take a fairly long time, perhaps several seconds, before it will again produce a normal image. In connection with this drawback of saturation, it should also be mentioned that, where the light energy received is even more excessive, there is a risk of the target being destroyed, for which there is no remedy. Furthermore, the camera tube may incorporate a light image intensifier stage having a luminescent screen the input of which receives the incident radiation through an optical focussing lens. In the case of too strong an illumination, presistance on the screen may be too long and this may result in the image being lost until this so-called "afterglow" effect ceases with the return to the normal persistence level.

It is therefore helpful to provide the arrangement with means for protecting the tube against the effects of excessive illumination. It is also well to provide the arrangement with means for controlling the amplitude of the video signal so as to ensure that substantially optimum operating conditions are maintained when ambient illumination varies within a pre-established operating range.

According to known techniques, it is possible to regulate the video signal from the difference between the mean level of the video signal and a reference level which is equivalent to the tube operating under optimum conditions. This measurement gives an error signal which is used in a control loop to control the amplitude of a very high DC voltage supplying the tube and thus, by varying the gain of the tube the video signal is regulated. The regulation circuit presents a certain response time constant due to the measure of the mean video signal and is therefore only able to operate effectively when illumination is within a limited range.

OBJECT AND SUMMARY OF THE INVENTION

An object of the invention is to provide a low light level television pick-up tube arrangement which is capable of operating over a wide range of illumination, for example from $10^{-4}$ lux to 100 lux, the optical lens of the camera having no mechanical diaphragm, and the television tube incorporating at least one light-image intensifying stage located at the input and preceding the electron gun. In accordance with the invention, the arrangement is fitted with protection means which produces an obturator effect by cancelling out the gain of the input intensifier stage and regulating means which produce a diaphragm effect by varying the gain of the input intensifier stage.

In accordance with a feature of the invention, the pick-up tube arrangement incorporates supply means of the very high switchable voltage type for supplying the input intensifier stage, and means for controlling the said supply so as to produce a very high supply voltage the amplitude and duration of which can be varied in accordance with a predetermined law as a function of the mean value of the video signal, the said variation producing a diaphragm effect by varying the gain of the said intensifier stage and thereby regulating the video signal.

BRIEF DESCRIPTION OF THE DRAWINGS

The invention will now be further described with reference to the accompanying drawings, in which the same parts are indicated by the same reference numerals and which show.

DESCRIPTION OF THE PREFERRED EMBODIMENTS

Figure 1:
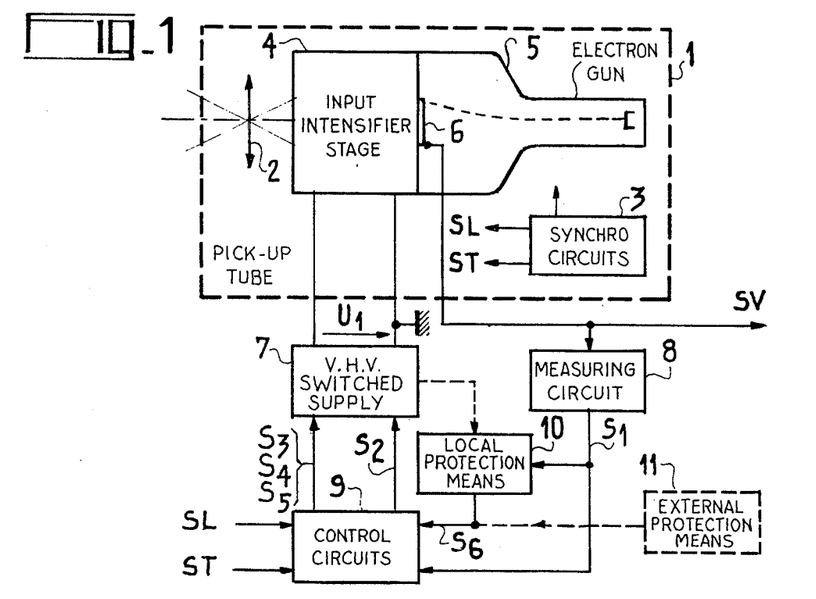
FIG. 1, a simplified block circuit diagram of a pick-up tube arrangement in which the tube comprises one intensifier stage.

The low light level tube arrangement shown in FIG. 1 contains an electronic camera 1 which combines optical input lens 2, a low light level pick-up or T.V. tube 4, 5, 6 and associated circuits 3.

The optical lens 2 focusses radiation from an observed field onto the input to the tube. Circuits 3 produce the signals required for the operation of the tube, in particular scanning and synchronization signals. The tube includes light-image intensifying means 4 positioned between the optical lens 2 and the tube-section proper 5, which latter is formed by an electron gun in which a target 6 is scanned line-by-line by a cathode-ray beam to extract the video signal SV. In the diagram of FIG. 1, the intensifier means are assumed to be restricted to a single intensifier stage and this stage is fed by a very high voltage (VHV for short) U1 from a VHV supply circuit 7 which is of the switchable type. Regulation controlling means 8 and 9 receive the video signal SV and produce signals for controlling the VHV supply 7. These regulating means consist of a first circuit 8 which supplies an error signal S1 representing the measured difference between the mean value of the video signal SV and a reference value. This reference value is predetermined as a function of the technical characteristics of the tube, the tube operating under optimum conditions when the amplitude of the video signal varies over a specified range. A second circuit 9 receives the error signal S1, together with horizontal suppression signals SL and vertical suppression signals ST from the synchronizing circuit 3, and produces signals for controlling the switched VHV supply 7 so that the gain of the intensifier 4 can be altered by varying the very high voltage U1 supplied to it and the required diaphragm effect can thereby be achieved.

Circuits 8, 9 and 7 together form a loop for slaving the very high voltage U1 to the mean value of the video signal SV. An embodiment of this loop is described below with reference to FIGS. 4 to 8. The elements making up the loop are calculated to provide regulation of the video signal over the wide range of illumination envisaged for operation. Thus, the amplitude of the video signal SV is held within, or brought back into, the range of variation which corresponds to optimum operation of the pick-up tube, assuming that the variations in illumination are compatible with the response time of the control loop. This response time is due chiefly to circuit 8, in which the operation of measuring the mean value requires a certain integration period which is generally equivalent to a number of successive vertical scans. As an example, the time-constant of the integration circuit in question may be 100 milliseconds, corresponding to five vertical scans of the target each of which takes 20 milliseconds. Instantly responding protective means are further provided to guard against the effects of sudden intense illumination. These means temporarily cancel out the effect of the control loop for as long as the energy received by the target exceeds a predetermined critical threshold and produce an obturating effect which gives the required protection.

These protection means are referenced at 10 and they receive local information on illumination which may, inter alia, be produced in the way which will be described later with reference to FIG. 10. An obturation signal S6 is generated as soon as the critical energy level is reached at the target 6. Through control circuit 9, signal S6 causes the very high voltage U1 to return to a threshold value V1 at which the obturation effect occurs, where it remains until the disturbance phenomenon ceases and the energy received by the target drops back to a tolerable level.

The obturation signal S6 may also be produced by an external command from an ancillary circuit 11. In particular, this may be the case where the application is to a firing system, the signal S6 being a command which precedes the discharge of weapons operating in the filed of the camera. Thus, what is involved in this case is no longer a random phenomenon but rather a predictable one of which, in particular, the duration is known. The obturation signal is formed by a pulse whose duration is determined accordingly.

By way of example, the very high voltage U1 may vary between a threshold potential V1 equal to 2Kv, at which value the obturation effect occurs, and a potential level V2 which is variable between the threshold potential 2Kv and a maximum value 10Kv thus producing the effect of an adjustable diaphragm.

Figure 2:
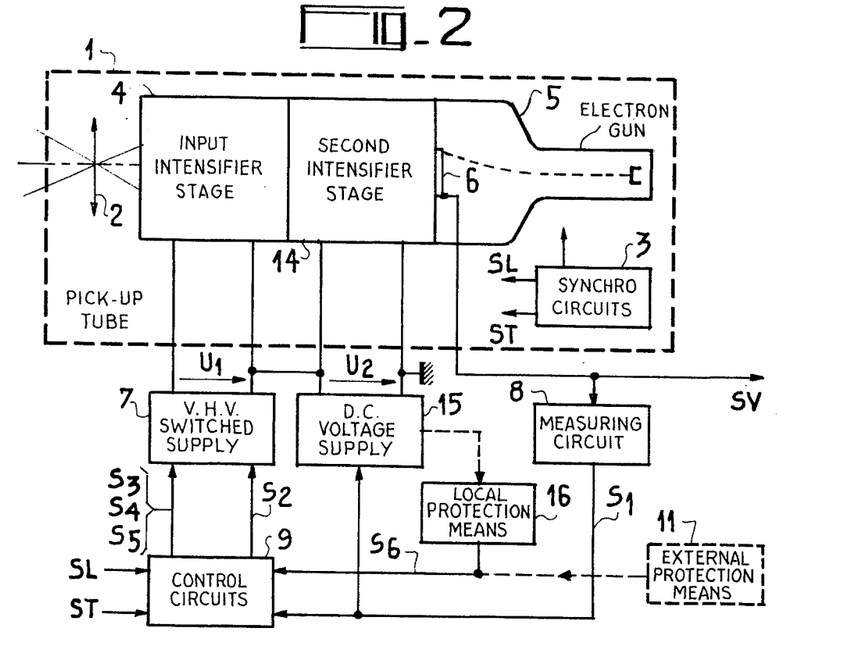
FIG. 2, a simplified block circuit diagram of a pick-up tube arrangement in which the tube comprises a plurality of intensifier stages in cascade.

FIG. 2 shows a low light level pick-up tube arrangement in which there is a plurality of intensifier stages connected in cascade between the optical lens 2 and the electron gun 5. In known embodiments of such tubes, the number of stages is generally restricted to two, as shown, these consisting of a first or input stage 4 and a second stage 14. A VHV supply 15 of the DC type produces a very high DC voltage U2 to supply the second stage 14. The error signal S1 is applied to VHV circuit 15 to allow the amplitude of voltage U2 to be controlled. In a known way, the combination of 8 and 15 forms a loop for regulating the video signal SV. The effect of this regulation supplements that of the aforementioned loop 8, 9, 7, the latter being more effective and faster by reason of the fact that it allows both the duration and the amplitude parameters of voltage U1 to be controlled. It is understood that, in the case of a tube having a number $n$ of stages greater than two, the stages in positions 2 to $n$ are supplied separately in the same way as stage 14 by one or more DC supplies, with each stage receiving a separate high supply voltage and that the amplitude control exerted by the aforementioned regulating loop may be exercised on one, or a number, or all of the stages in positions 2 to $n$. The local protection means which provides an obturator effect are represented by block 16 and an embodiment thereof is described later with reference to FIG. 9.

Figure 3:
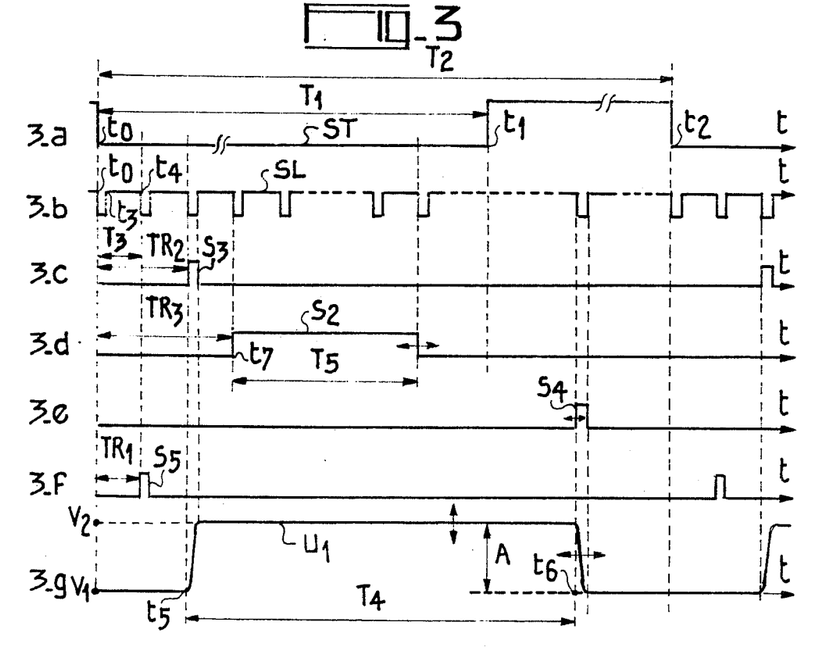
FIG. 3, wave-forms relating to the main signals used in a pick-up tube arrangement as shown in FIGS. 1 or 2.

FIG. 3 shows waveforms for the main signals used in a pick-up tube arrangement according to the invention. FIG. 3a represents the vertical suppression signal ST which consists of a negative-going pulse of duration T1 (from time $t0$ to time $t1$), during which the vertical flyback takes place, and of a positive-going pulse situated between $t1$ and $t2$ during which the vertical scan takes place, the total length T2 corresponding to the vertical period. Suppression signal SL (FIG. 3b) is of the same type and consists of a negative-going pulse extending from $t0$ to $t3$ for the horizontal flyback, the horizontal scan taking place from $t3$ to $t4$ with a horizontal period of T3.

Signals SL and ST are synchronised, and by way of example the length of the horizontal period may be 64 microseconds with a suppression time $t0$ to $t3$ of 12 microseconds, the durations T1 and T2 and multiples of T3, amounting to approximately 1.6 milliseconds and 20 milliseconds respectively.

Waveforms 3c to 3f relate to control signals produced by circuit 9 and waveform 3g represents the very high voltage U1. Certain of the control signals act on the parameter represented by the length of the T4 for which the very high voltage U1 is applied in the course of each vertical scan, the function of these signals being to bring about the upward change in the very high voltage U1 from V1 to V2 and the corresponding downward change of this voltage from V2 to V1 at determined times.

In a preferred embodiment, the upward and downward changes are advantageously caused to occur once in the course of each vertical period T2 so as to effectively produce the desired diaphragm effect. The upward change in the very high voltage is brought about at a time $t5$ in the course of the vertical suppression interval T1. Time $t5$ is determined to have a fixed lag TR2 with respect to the beginning of the vertical frame period T2, a variable duration T4 of the very high voltage being produced by altering the time $t6$ at which the subsequent downward change in the very high voltage takes place; the signal for the very high voltage to rise is thus cyclic and its repetition period is the same as the vertical period T2. The changes in the very high voltage, and particularly the downward one, are brought about in synchronisation with a horizontal suppression pulse SL, with the result that they occur in the course of a flyback. In addition, the times taken by the very high voltage to rise and fall are advantageously made sufficiently short for the changes to occur during the corresponding horizontal suppression interval. In this way it is possible to prevent change-over interference signals being produced on the target 6 of the tube. The duration controlling signals may be three in number and in the cases of the embodiments which are described below with reference to FIGS. 4, 5 and 6 or 4, 5, 7 and 8, they are referred to as S3, S4 and S5. Signal S3 (FIG. 3c) causes the very high voltage to rise and signal S4 (FIG. 3e) causes it to fall.

The amplitude parameter of the very high voltage U1 may be acted on by means of a control signal S2 (FIG. 3d) which is formed by a pulse whose duration T5 is varied by shifting its trailing edge and which is generated during the vertical suppression interval T1. The leading edge of pulse S2 is produced at a time $t7$ which is calculated to have a lag TR3 with respect to the beginning of the vertical period $to$, while the position of the trailing edge may vary as far as the instant $t1$ at which the image scan begins. The amplitude A of the change in the very high voltage U1 between V1 and V2 is a function of the length T5 of pulse S2 (FIG. 3g).

According to the variation in the error signal S1 as a function of incident illumination and whether the variation in the signal is confined to the optimum operating range as determined by the technical characteristics of the tube or exceeds this range, a law is established to govern the duration and amplitude parameters which allows the video signal to be slaved and regulated by altering the gain of stage 4 and by means of the resulting diaphragm effect. The aforementioned parameters may or may not vary simultaneously depending on the value of signal S1 and the control law involved.

Figure 4:
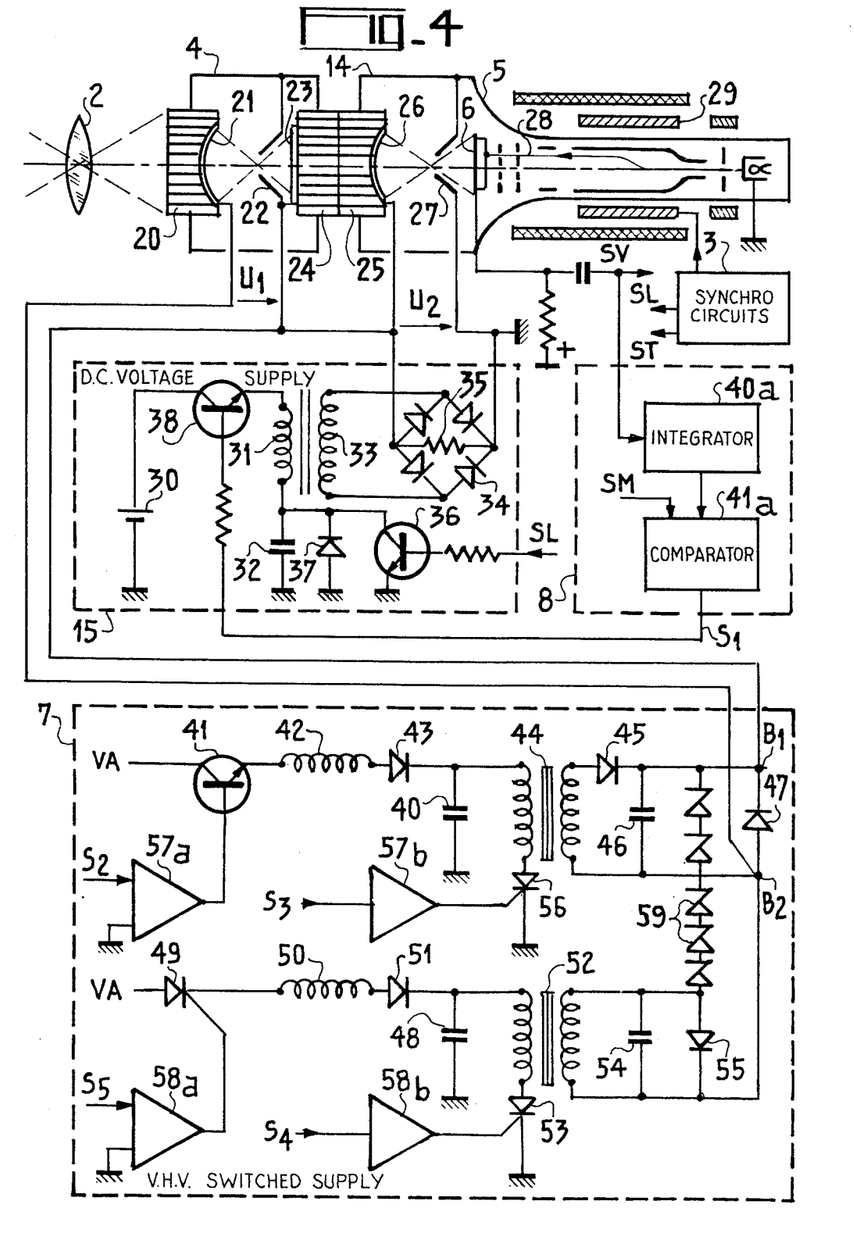
FIGS. 4, 5 and 6, circuit diagrams and wave-forms of a preferred embodiment of the pick-up tube arrangement according to FIG. 2.

A preferred embodiment of the pick-up arrangement will be described with reference to FIGS. 4, 5, 6 and 10. In this embodiment will be considered the case of a tube having two intensifier stages as shown in FIG. 2. FIG. 4 shows in particular the very high voltage supply section. The first stage 4 is a light-image intensifying tube having a luminescent screen. It consists of an optical-fibre input window 20, a photocathode 21, an anode 22, a luminescent screen 23 and an optical-fibre output window 24. The photocathode 21 arranged on the input window 20 converts the light image into an electronic image. The emitted electrons, once accelerated and suitably focussed, create a light image by bombarding a luminescent screen 23 arranged on the output window.

The second intensifier stage 14 is associated with the electron gun 5 to form a tube. Intensifying section 14 consists of an optical-fibre input window 25, a photocathode 26 and an anode 27. The electrons emitted by the photocathode 26 are focussed onto a dielectric target 6 where they are locally multiplied without inertia and are collected by a signal electrode when scanning takes place. The electron gun 5 restores the target to its initial state by a cathode-ray scan, as in a television pick-up tube, thus generating the video signal SV. The coils shown schematically on the outside of the gun are intended to aim, focus and deflect the electron beam 28. A circuit 3 provides the scan signals applied to deflector coils 29.

The circuit 15 supplying the intensifier 14 is of the DC supply type and may, for example, be formed in the manner shown in FIG. 4. A local, low-voltage DC source shown at 30 supplies an LC circuit which consists of the primary winding 31 of a step-up transformer in series with a capacitor 32. The secondary winding 33 of the transformer feeds a first diagonal of a bridge made up of four rectifiers 34 and the second diagonal of which contains a resistive member 35. A transistor 36, which is connected as a switch and is protected by a diode 37, is activated by the horizontal suppression signal SL so as sequentially to short-circuit capacitor 32. Signal SL cuts off the transistor during each negative-going pulse corresponding to horizontal suppression, the transistor being conductive for the rest of the time during each line period. Resistor 35 is so chosen as to form, in conjunction with the residual capacitance exhibited by stage 14, an RC circuit whose time constant is sufficiently short to produce conditions in which the voltage U2 at the terminals of the stage is able to alter quickly. The video regulating action is produced by a transistor 38 which is inserted between source 30 and winding 31. Thus transistor is controlled from its base, at which the error signal S1 is received, and it behaves as a variable resistive impedance in series with source 30.

The measuring circuit 8 comprises an integration circuit 40a and a comparison circuit 41a. Signal SV is applied to circuit 40a and this circuit may comprise an amplifying and separating circuit in series with a resistance-capacitance integrating module having a time-constant which is calculated to be equivalent to a certain number of vertical scans. The mean level of the video signal received at the terminals of the capacitor is compared in circuit 41a with a reference level SM so as to produce the analogue error signal S1. Level SM is substantially the same as the video amplitude level which is envisaged by the manufacture as the optimum for the operation of the tube.

The switchable VHV supply circuit 7 feeds a supply voltage U1 to the first stage 4 via two terminals B1 and B2. This voltage is obtained by charging a capacitor 40 for a length of time which is controlled by the amplitude controlling signal S2, the charging circuit is connected to a low-voltage DC source similar to source 30 in circuit 15. It incorporates an electronically-controlled switch such as a transistor 41, which is controlled from its base electrode, and a resonant circuit consisting of an inductance 42, a diode 43 and the capacitor 40 which allows a maximum charge of substantially of valve 2VA for the maximum length allowed for signal S2. Capacitor 40 is discharged through a transformer by operating an electronic switch, such as a thyristor 56, which receives the rise signal S3. Signal S3 is cyclic and its repetition period is the same as the vertical period T2. It is produced during the vertical suppression time T1 and has a fixed and predetermined lag TR2 with respect to the time $t_0$ at which the vertical signal begins (FIG. 3c), time TR2 being equal to a whole number of horizontal periods T3. The charge is transmitted, by a circuit consisting of the secondary winding of transformer 44 and a diode 45, to a capacitor 46 which is connected in parallel with a diode 47 across terminals B1 and B2.

In the same way, a capacitor 48 is charged through members 49, 50, 51 by applying a charging pulse S5 which has a predetermined lag TR1 (FIG. 3f) with respect to the time $t_0$ at which a vertical scan begins. Lag TR1 is a multiple of the horizontal period T3 and is less than lag TR2. The elements and the sizes of the lags TR1 and TR2 are so determined that C3 (40) has finished charging before the rise pulse S3 appears. The circuit 52, 53 for discharging capacitor 48 is triggered by the fall pulse S4 (FIG. 3e). The charge is transmitted to a capacitor 54 which has a diode 55 connected in parallel across its terminals and which is connected at one end to terminal B1 via an avalanche diode network 59 and at the other end to terminal B2. Diodes 59 are brought to their avalanche zone by the charge from capacitor 54. They therefore have a very low dynamic resistance which allows the capacitor 46 to discharge very fast. The times taken by voltage U1 to rise and fall between V1 and V2 are very short and may thus easily be as little as 10 microseconds, which time is less than the envisaged length of the horizontal suppression signal. In this way it is possible to avoid producing interference on the image. The amplifier circuits 57a, 57b, 58a and 58b shown may be of the operational type and their purpose is to produce respective output signals S2, S3, S4 and S5 having the requisite polarities.

Figure 5:
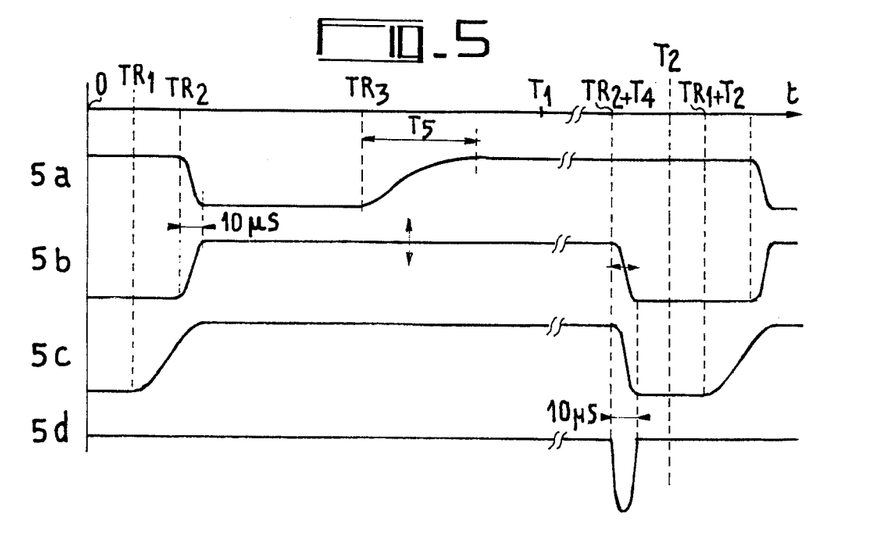

Waveforms 5a to 5d in FIG. 5 represent the changes in potential at the terminals of capacitors 40 (FIG. 5a), 46 (FIG. 5b), 48 (FIG. 5c) and 54 (FIG. 5d) respectively in the course of one vertical scan period T2.

As shown in FIG. 3d, the amplitude controlling signal is formed by a pulse whose leading edge is fixed and has a delay TR3 with respect to time $t_0$, which delay is a multiple of the horizontal period T3. The delay TR3 is made greater than the delay TR2 of the rise signal S3 and is for example equal to TR2 plus one line period T3. The position of the trailing edge of pulse T5 may vary within the horizontal suppression time T1 in such a way that the maximum value of T5 remains less than T1-TR3.

Figure 6:
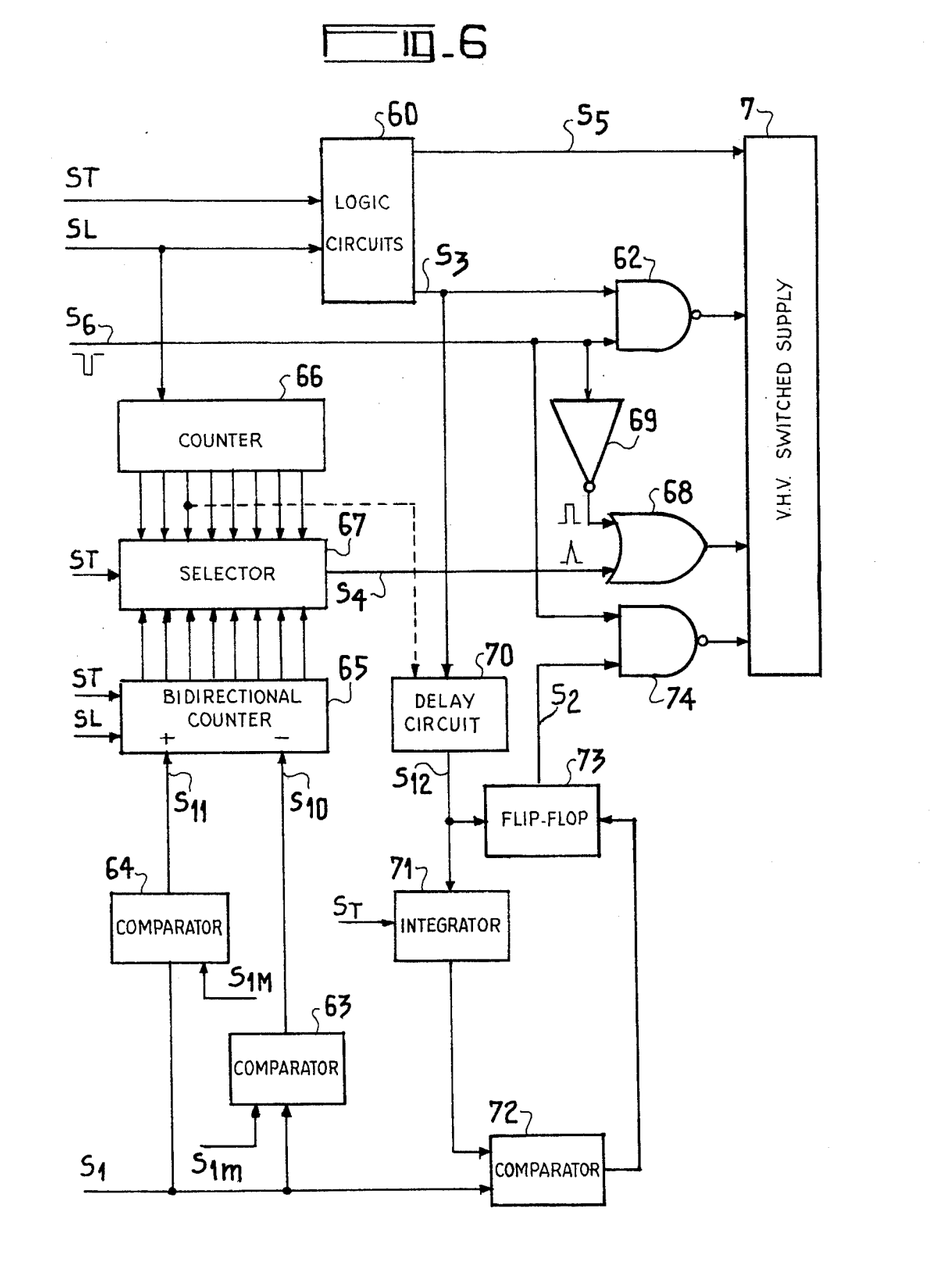

FIG. 6 shows a first embodiment of the control circuit 9. In this preferred embodiment, the method of operation envisaged is as follows: let S1m and S1M be the minimum and maximum values respectively of the error signal S1 which define a range representing the tube operating in good conditions. Voltage U1 is held at a constant duration T1 when S1 is inside this range and is of variable duration when S1 moves outside this range. The amplitude of voltage U1 is made capable of variation as a function of S1 both when the latter changes while remaining within the range S1m to S1M and when its change takes it outside this range. The low governing the variation in amplitude will preferably be a substantially linear law.

A logic circuit 60 which may be formed on the basis of elementary logic circuits such as gates and flip-flops, receives the synchronising signals SL and ST to produce the signal S3 for the rise in the very high voltage and the signal S5 to cause capacitor 48 to be charged. An embodiment of the logic circuit 60 will be further described with the aid of FIGS. 11 and 12. Signal S3 is transmitted to VHV circuit 7 via a NAND circuit 62 which also receives the obturation signal S6. Signal S6 is assumed to be a binary signal which goes from value 1 to value 0 when an obturation signal occurs.

The error signal S1 is compared with values S1m and S1M in two comparator circuits 63 and 64 of the type having a logic output. The values of output signals S10 and S11 are respectively 0 and 0 when S1 is between S1m and S1M, 1 and 0 when S1 is below S1m, and 0 and 1 when S1 is above S1M. They are applied to a bidirectional counter circuit 65 which is synchronised by signal SL. Signal S10 causes a downward count as soon as its value is 1 and conversely signal S11 produces an upward count when its value becomes 1. A counting circuit 66 having $n$ outputs produces at its respective outputs signals of period 2T3, 4T3 ... 2nT3, using signal SL as a basis. At each vertical period a data selector 67 selects the appropriate output $j$ of circuit 66 as dictated by the content of bidirectional counter 65 and produces a short pulse which has a lag of 2jT3 with respect to the time $t_0$ at which the vertical period begins. This signal is intended to form the fall signal S4 and is applied to circuit 7 via an OR circuit 68 which also receives the obturation signal S6 after it has been inverted in an inverter circuit 69. OR circuit 68 normally delivers signal S4 and then delivers signal S6 instantly as soon as it appears so as to bring about an immediate fall in voltage U1.

The amplitude controlling signal S2 is produced by circuits 70 to 74. Circuit 70 is a delay circuit which, on the basis of signal S3, supplies a pulse S12 which is located at a fixed and predetermined time $t7$ (FIG. 3d) from the beginning of the vertical period. Since delay TR3 has a value which is predetermined to be a multiple of period T3, circuit 70 may consist of a logic circuit such as a monostable flip-flop which is used to produce a signal S12 from an appropriate output of counter 66 which is shown as a broken line. Signal S12 triggers an integrator 71 whose output is compared with error signal S1 in a logic-output comparator circuit 72 which gives a value "1" as soon as the integration level reaches the value of S1. The output of the comparator is applied to a circuit 73 of the flip-flop type which has previously been triggered by signal S12 and which produces the pulse S2 whose length T5 can be varied by shifting its trailing edge. Signal S2 is applied, via a NAND circuit 74 which also receives signal S6, to VHV circuit 7. Integrator circuit 71 is reset to zero by synchronising signal ST.

Via circuits 62 and 74, the obturation control signal S6 cancels out the amplitude and rise signals and via circuits 69 and 68 causes the very high voltage to fall to the threshold level V1. The members which play a part in producing the amplitude controlling signal S2 are so chosen that time TR3 + T5 remains less than, or at most equal to, the vertical suppression time T1. It will be noted that the time T4 for which voltage U1 is applied can be altered from one vertical scan to the next, that is it can be halved or doubled, as called for by the change in signal S1. If signal S1 changes very fast, the process of catching up with it takes place by a power of 2 geometric progression. Time T4 is equal to a whole number of horizontal periods T3. Its minimum value may be made equal to one horizontal period T3 and its maximum value equal at most to the number of horizontal periods between time $t5$ (FIG. 3g) and the end of the vertical scan at time $t2$ (FIG. 3a).

Figure 7:
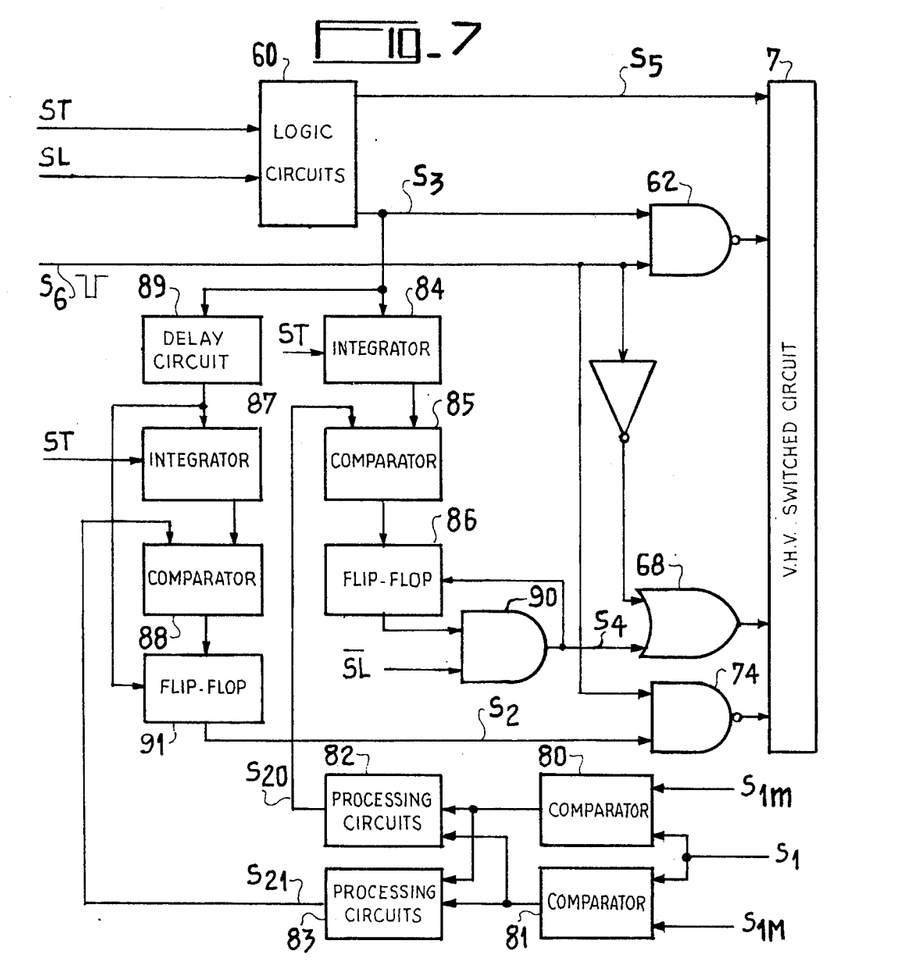
FIG. 7, a circuit diagram of a second embodiment of control circuits for the switchable very high voltage supply to the input intensifier stage.
Figure 8:
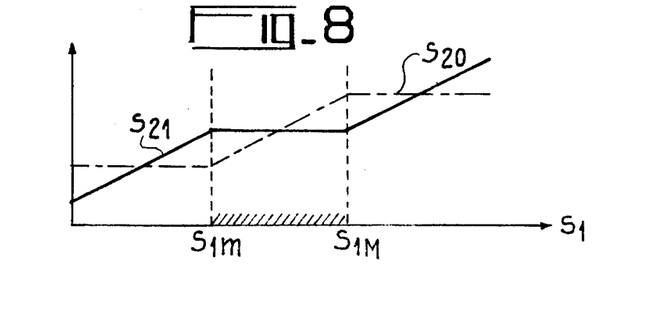
FIG. 8, a graph of the variation in the duration and amplitude parameters of the switchable very high voltage in the case of an embodiment according to FIG. 7.

FIG. 7 shows a second embodiment of the control circuit 9 corresponding to another method of operation as represented by the waveforms in FIG. 8. The application time T4 varies (waveform S20) and amplitude A is constant (waveform S21) when S1 is between S1m and S1M, while conversely the application time is constant and amplitude varies when S1 is outside the range S1m and S1M. Signals S3 and S5 may be produced in the same way as in the case of FIG. 6.

Signal S1 is applied to two differential comparators 80 and 81 of the analogue type, the respective reference values of which, S1m and S1M, define the video range envisaged. The comparison outputs are applied simultaneously to the circuits shown at 82 and 83 and these produce the signals S20 and S21 of FIG. 8 respectively. To this end, the comparison signals S1 - S1m and S1 - S1M from the comparators may be processed in circuits 82 and 83 as described further with the aid of FIGS. 13 and 14.

Signal S20 is used to produce the signal S4 for the VHV to fall. Signal S3 triggers an integrator circuit 84 which performs a linear integration operation from time $t5$ to the time $t2$ which marks the end of a vertical period, at which time it is reset to its initial state by signal ST. The integration output is compared with signal S20 in a logic-output comparator circuit 85. The output of this comparator triggers a flip-flop circuit 86, the output of which is applied to an AND circuit 90. Circuit 90 also receives signal SL after inversion so as to cause circuit 86 to change back. The pulse S4 supplied from the output of circuit 90 is applied to the VHV supply 7 via OR circuit 68.

Signal S21 is used to generate amplitude signal S2. The means employed consist, in a similar way of an integrator circuit 87, a comparator circuit 88, and a flip-flop circuit 91. Circuits 87 and 91 are triggered at time $t7$. To this end, the rise pulse S3 is delayed from TR2 to TR3 in a delay circuit 89. The output of comparator 88 causes flip-flop circuit 91 to change back and this circuit delivers signal S2 to the VHV supply 7 via a NAND circuit 74.

In the embodiment of FIG. 7, the length T5 of the amplitude signal S2 is made continuously variable outside the range S1m to S1M and consequently the amplitude of the very high voltage U1 may alter very fast in these zones in the areas. Similarly it is possible for the duration T4 of the very high voltage U1 to vary continuously and rapidly within the range S1m to S1M.

Figure 9:
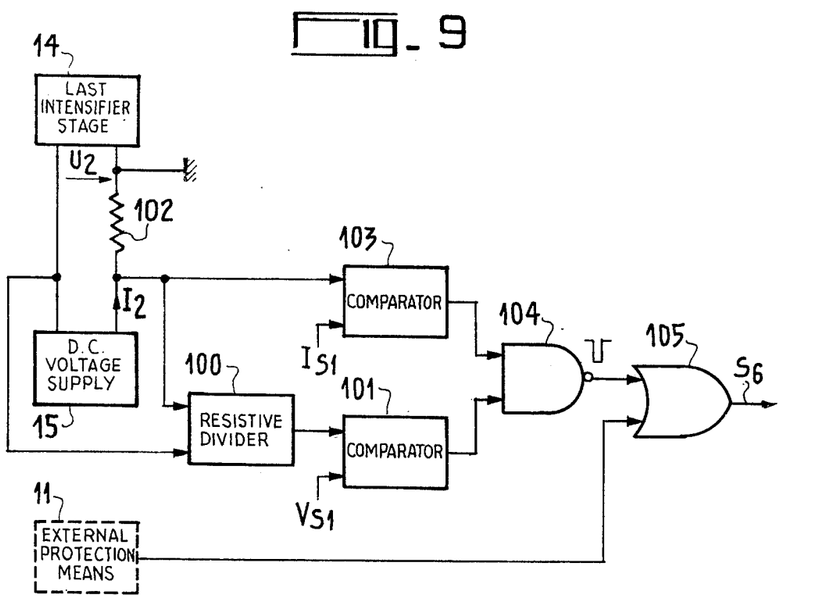
FIG. 9, a simplified diagram of protecting means utilized in an arrangement as shown in FIG. 2.
Figure 10:
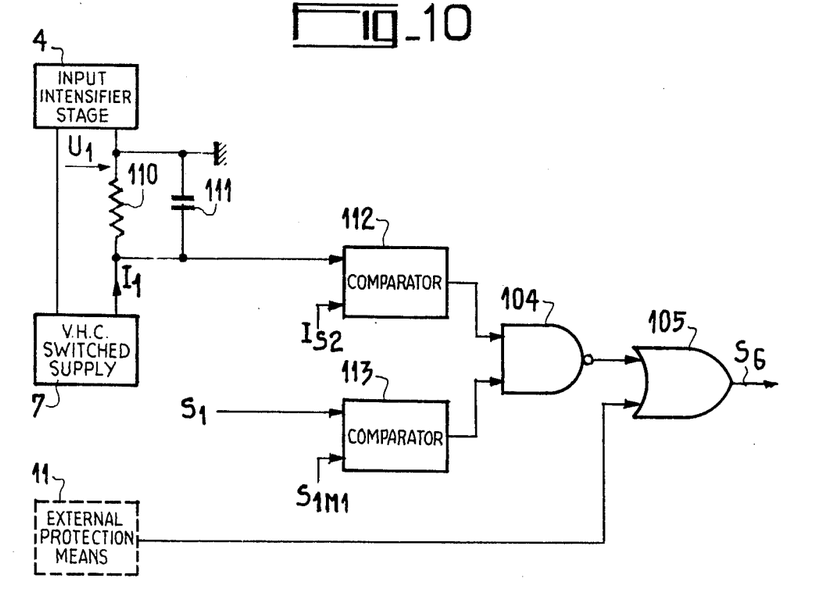
FIG. 10, a simplified diagram of protecting means utilized in an arrangement as shown in FIG. 1.

FIGS. 9 and 10 relate to embodiments of the local means for providing obturation protection against the effects of very bright illumination capable of damaging the tube which develops in a time shorter than the response time of the loop 8, 9, 7 for regulating the video signal which is shown in FIG. 1, or of the combined loops 8, 7, 9 and 8, 15 shown in FIG. 2.

FIG. 9 relates to an embodiment of circuit 16 of FIG. 2, that is to say, to the preferred case where the tube has at least two intensifier stages in cascade. The VHV supply 15 is of the DC type and the amplitude of the very high voltage U2 to the intensifier stage 14 is controlled by means of signal S1. The very high voltage U2 varies slowly in comparison with the very high switched voltage U1 for the first stage 4. The protection means used enable the energy received by the target to be measured and the obturation signal S6 to be produced instantly as soon as a critical threshold is reached. The energy received is a function of the value of the parameter U2, which imparts a certain acceleration of the electrons emitted by photocathode 26 (FIG. 4) and of the value of the parameter I2 represented by the current from supply 15, the latter parameter being directly related to the illumination received at the input to the camera. The protective arrangement consists of a voltage reducing circuit such as a resistive divider 100, which receives voltage U2 and whose output is compared to a threshold VS2 in a logic-output comparator circuit 101. Threshold VS1 is selected so as to correspond to a predetermined maximum value of voltage U2. The output of the comparator gives a signal 1 as soon as threshold VS1 is reached. A resistive member 102 inserted in the output connection from the supply on the earth side allows a signal KI2 to be picked off which is proportional to the VHV supply current I2. This signal is likewise compared with a threshold IS1 in a logic-output comparator circuit 103. Value IS1 is determined bearing in mind the maximum energy level tolerated by the target, this being dictated by the technical characteristics of the tube and being a function of the product of VS1 × IS1. The comparison output assumes the value 1 as soon as threshold IS1 is reached. The two comparison signals are applied to a NAND circuit 104 which supplies local signal S6 in the form of a negative-going pulse. Local signal S6, or an external signal from an ancillary circuit 11, is finally transmitted by means of a two-input OR circuit 105.

The embodiment shown in FIG. 10 relates to the case of FIG. 1 where the tube has only one intensifier stage 4. A resistive member 110 inserted in the supply connection on the earth side enables the derivation of a signal proportional to the pulsed current I1 supplied to input stage 4. A capacitor 111 which is connected in parallel with member 110 allows the mean value of current I1 to be obtained. This latter value is compared to a threshold IS2 in a logic-output comparator circuit 112. The second parameter used is the error signal S1 which is related to the value of the applied VHV U1. Signal S1 is compared to a threshold S1M1 in a logic-output comparator circuit 113. Thresholds IS2 and S1M1 are calculated conjointly bearing in mind the maximum energy level permitted when VHV U1 is at a miximum. Logic circuits 104 and 105 are again present as in the embodiment of FIG. 9.

Figure 11:
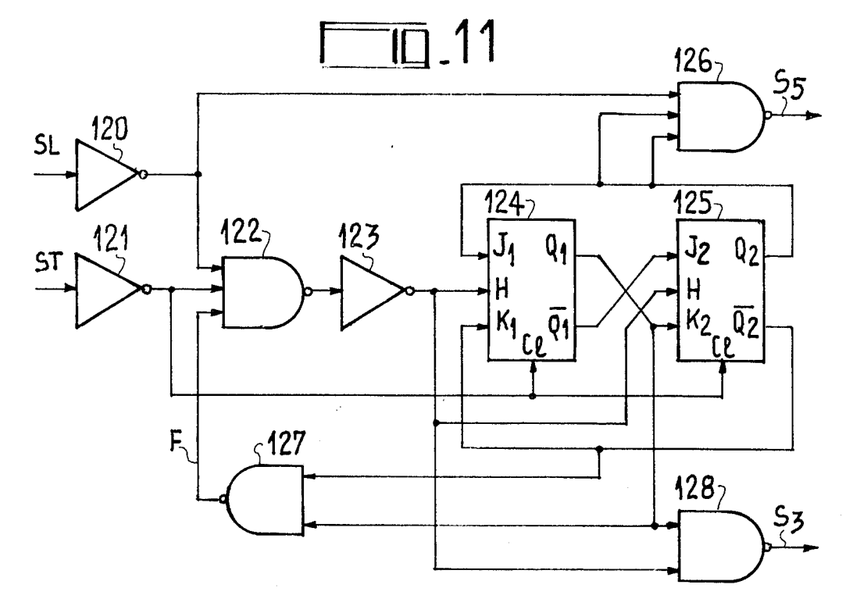
FIGS. 11 to 14, circuit diagrams and operating wave-forms of circuits comprised in the control circuit for the voltage supply to the input intensifier stage.
Figure 12:
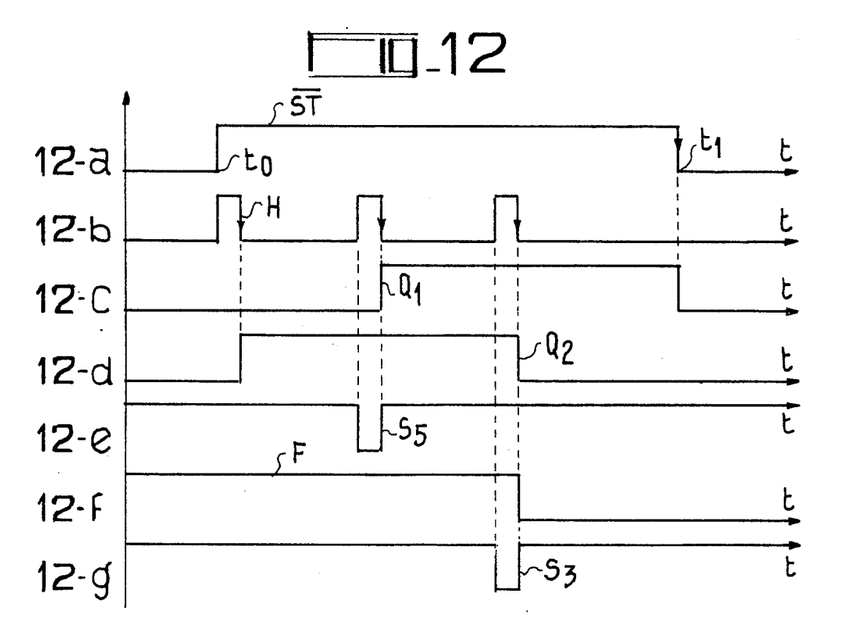

FIG. 11 shows an embodiment of the logic circuit 60 of FIG. 6. The synchronising signals SL (FIG. 3b) and ST (FIG. 3a) are inverted in inverter circuits 120 and 121 respectively and after which applied to a group of circuits 122 to 128 which consists chiefly of NAND circuits and also includes two flip-flop circuits to produce signals S3 (FIG. 3c) and S5 (FIG. 3f). The way in which this group operates can be seen from the waveforms 12a to 12g of FIG. 12 which represent, respectively, the output signals from inverter circuit 121, inverter circuit 123, terminal QI of flip-flop circuit 124, terminal Q2 of flip-flop circuit 125, NAND circuit 126, NAND circuit 127 and NAND circuit 128, Flip-flop circuits 124, 125 are reset to zero by the trailing edge of the vertical suppression pulse ST and are triggered by the negative-going edges of the signals (inputs H and Cl).

Figure 13:
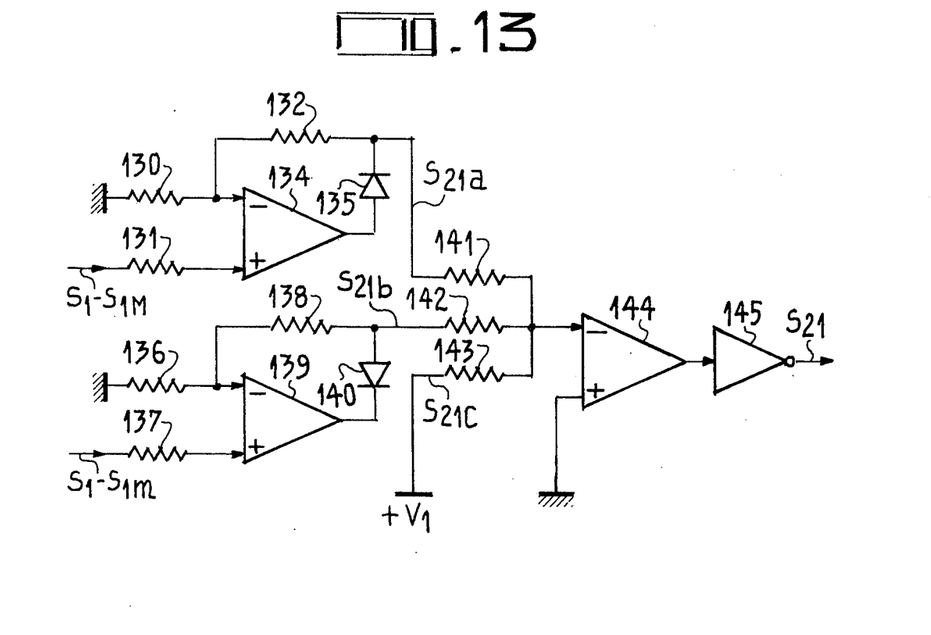
Figure 14:
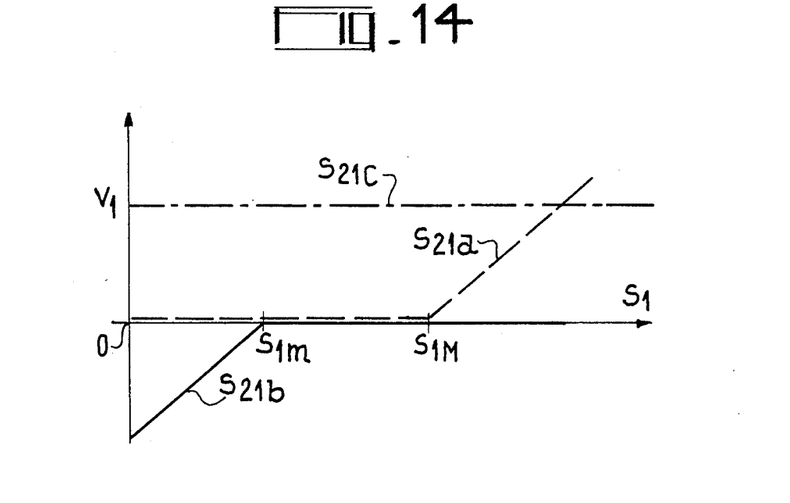

FIG. 13 shows an embodiment of the processing circuit 83 of FIG. 7. To produce the signal S21a shown as a broken line in FIG. 14, output S1 - S1M of subtractor circuit 81 is applied to an operational amplifier circuit which is made up of resistive members 130 to 132, an operational amplifier 134 and a diode 135. To produce the second signal S21b, which is shown as a solid line in FIG. 14, output S1 - S1m of substractor circuit 80 is applied to a second operational amplifier circuit which combines resistive members 136 to 138, amplifier 139 and diode 140. A third signal S21c is formed by a fixed DC voltage + V1 which is shown as a dotted and dashed line in FIG. 14. The three signals S21a, b, c are added together in a summing circuit which may consist of a network of resistors 141 to 143 and an operational amplifier 144. The output of the latter is inverted in an inverter circuit 145 to produce a signal S21 of the required polarity (FIG. 8).

Circuit 82 may be similarly designed so as to produce the signal S20 by using an operational amplifier circuit, two DC voltages and a summing circuit.

As shown by the foregoing description, the low-hight-level pick up arrangement is provided with an electronically controlled diaphragm which allows adjustment of its aperture, and the length of time for which the aperture is open during each vertical scan, and it also incorporates a safety arrangement which acts as an obturator. In the embodiment of FIG. 6 the variable aperture and variable speed diaphragm effect is produced by a discontinuous variation in the duration parameter, whilst in the embodiment of FIG. 7 the effect is produced by a continuous variation.

The law governing the changes in the duration and amplitude parameters of the very high voltage is predetermined so as, inter alia, to produce the desired result whilst avoiding hunting phenomena in the regulating circuits by interaction. The conditions under which the signals for controlling and varying the VHV potential shown in FIG. 3 are synchronised should not be looked upon as limiting the invention. They are simply advantageous since they prevent the production of interference phenomena in the image on the target.

A tube having one intensifier stage (4, FIG. 1 ; 14, 5 FIG. 4) may, for example, be one of the type known marketed under the trademark NOCTICON, and a two stage tube (4, 14, 5 FIG. 4) may similarly be of the Super-NOCTICON type.

What is claimed is:

1. A low light level television pick-up tube arrangement comprising: optical means for focussing radiation received from an observed field; an image pick-up tube for receiving the said focussed radiation and for delivering a video signal, the said pick-up tube comprising image intensifying means arranged between the said optical means and an electron gun from which said video signal is derived by electronically scanning a target, said image intensifying means comprising an input intensifier stage which receives the said focussed radiation; a measuring circuit for generating an error signal representative of the difference between the existing mean value of the said video signal and a predetermined mean reference value; a very high voltage switched supply for supplying a switched voltage to the said input intensifier stage and a control circuit for generating from the said error signal control signals for controlling the said switched supply to provide predetermined variations in the amplitude and duration of the said switched voltage to automatically control the gain of the said intensifying means; and protection means to protect said tube against sudden and too intense illumination, said protection means generating an obturation signal applied to the said control circuit for controlling the said switched supply to provide an instantaneous downward change in the said switched voltage to cancel out the gain of the said intensifier means.

2. A pick-up tube arrangement according to claim 1, wherein said image intensifying means comprises a plurality of intensifier stages in cascade and a high voltage DC supply to produce separate DC voltages to supply respective ones of the intensifier stages situated downstream of the said input stage, the said error signal being applied to the said DC supply to control the amplitude of at least one of the said DC voltages for regulating the said video signal.

3. A pick-up tube arrangement according to claim 2, in which the video signal is obtained by a line-by-line scan of a target incorporated in the said electron gun and wherein the said controlled very high switched voltage supply provides a very high voltage switched between a constant lower value and a variable upper value, the said voltage being so switched once upwards and one downwards in the course of each vertical scan, the said upper value being constant during any given vertical scan.

4. A pick-up arrangement according to claim 3, wherein the said control signals comprise, a rise signal for the very high voltage to rise in the form of a cyclic vertical-scan pulse which is generated during the vertical suppression interval and which has a predetermined delay with respect to the end of the previous vertical scan, and a fall signal for the very high voltage to fall which is likewise in the form of a pulse and whose position can be varied between the said rise pulse and the end of the vertical scan in question, the said rise and fall signals being synchronised with the horizontal suppression signal, the said switched supply causing a change-over from the said fixed value to the said upper value at the rise and vice-versa at the fall, the change-over taking a length of time which is at most equal to the duration of the horizontal suppression signal.

5. A pick-up tube arrangement according to claim 4, wherein the said control circuit produces an amplitude controlling signal in the form of a pulse whose length can be varied by altering the position of its leading edge and whose leading and trailing edges are respectively synchronised with horizontal suppression pulses, the said leading edge having a fixed delay with respect to the end of the previous vertical scan, the said pulse being produced in the course of the vertical suppression interval and the change in the length of the pulse producing, via the switched supply, a substantially linear response law governing the change in the upper value of the very high switched voltage in the course of successive vertical scans.

6. A pick-up tube arrangement according to claim 5, wherein the control circuit comprises logic counting and selecting circuits to make the time for which the very high switched voltage is supplied constant within a specified range of variation on the part of the said error signal and variable outside this range, the permitted variation being of the discontinuous type with a power of two geometric progression from one vertical scan to the next.

7. A pick-up tube arrangement according to claim 5, wherein the control circuit comprises analogue circuits to make the length of time for which the very high switched voltage is applied variable within a specified range of variation on the part of the error signal and constant outside this range, the permitted variation being of the continuous type and being at least equal to one horizontal period.

8. A pick-up tube arrangement according to claim 5, wherein the said protection means comprises on the one hand, local circuits for measuring the energy received by the target to produce the said obturation signal as soon as a predetermined limiting energy level is reached and on the other hand, external circuits for providing the said obturation signal for a predetermined length of time.

9. A pick-up tube arrangement according to claim 8, wherein the said local protection circuits include a first threshold comparison circuit receiving a signal representative of the very high DC voltage supplied to the last intensifier stage and a second threshold comparison circuit receiving a signal representative of the DC current supply of the said last stage.

10. A pick-up tube arrangement according to claim 1, wherein the said protection means include a first threshold comparison circuit receiving a signal representative of the mean current supplied by the said VHV switched supply and a second threshold comparison circuit receiving the said error signal.

11. A low light level television pick-up tube arrangement comprising: optical means for focussing radiation received from an observed field; and image pick-up tube for receiving the said focussed radiation and for delivering a video signal, the said pick-up tube comprising image intensifying means arranged between the said optical means and an electron gun from which the said video signal is derived by electronically scanning a target, said image intensifying means comprising at least two image intensifier stages connected in cascade; a measuring circuit for generating an error signal representative of the difference between the existing mean value of the said video signal and a predetermined mean reference value; a very high voltage switched supply for supplying a switched voltage to the input intensifier stage receiving the said focussed radiation; a control circuit for generating from the said error signal control signals for controlling the said switched supply to provide predetermined variations in the amplitude and duration of the said switched voltage to automatically control the gain of the said input stage; high voltage DC supply means for supplying the intensifier stages situated downstream of the said input stage respectively with separate DC voltages, said error signal being applied to the said DC supply means to control the amplitude of at least one of the said DC voltages to provide amplitude regulation of the said video signal, and protection means to protect said tube against sudden and too intense illumination, said protection means generating an obturation signal applied to the said control circuit for controlling the said switched supply to provide an instantaneous downward change in the said supply voltage to cancel out the gain of the said intensifier means.

* * * * *